(12) United States Patent (10) Patent No.: US 8,128,496 B2
Takahashi et al. (45) Date of Patent: Mar. 6, 2012

(54) GAME DEVICE, OBJECT DISPLAY METHOD IN GAME DEVICE, AND DISPLAY PROGRAM

(75) Inventors: Hiroyuki Takahashi, Tokyo (JP); Shugo Takahashi, Tokyo (JP); Haruki Kodera, Tokyo (JP); Yusuke Sugimoto, Tokyo (JP)

(73) Assignee: Camelot Co., Ltd., Tokyo (JP)

( * ) Notice: Subject to any disclaimer, the term of this patent is extended or adjusted under 35 U.S.C. 154(b) by 97 days.

(21) Appl. No.: 12/375,461

(22) PCT Filed: Jul. 31, 2007

(86) PCT No.: PCT/JP2007/065024
§ 371 (c)(1),
(2), (4) Date: Mar. 9, 2010

(87) PCT Pub. No.: WO2008/016064
PCT Pub. Date: Feb. 7, 2008

(65) Prior Publication Data
US 2010/0285876 A1 Nov. 11, 2010

(30) Foreign Application Priority Data
Jul. 31, 2006 (JP) .................................. 2006-208707

(51) Int. Cl.
*G06F 17/00* (2006.01)
(52) U.S. Cl. ........................................................ 463/32
(58) Field of Classification Search .................. 463/2, 3, 463/30–33, 40, 42; 273/317.1, 317.2
See application file for complete search history.

(56) References Cited

U.S. PATENT DOCUMENTS

| 5,999,185 | A | * | 12/1999 | Kato et al. | 345/420 |
| 6,220,962 | B1 | * | 4/2001 | Miyamoto et al. | 463/32 |
| 6,352,476 | B2 | * | 3/2002 | Miyamoto et al. | 463/32 |
| 2006/0003825 | A1 | * | 1/2006 | Iwasaki et al. | 463/2 |

FOREIGN PATENT DOCUMENTS

| JP | 2003-352973 A | 11/2003 |
| JP | 2001-198362 A | 7/2004 |
| JP | 2005-323827 A | 11/2005 |
| JP | 2006-280462 A | 10/2006 |

OTHER PUBLICATIONS

International Search Report to corresponding PCT/JP2007/065024 application from Japanese Patent Office dated Oct. 23, 2007.

* cited by examiner

*Primary Examiner* — Ronald Laneau
(74) *Attorney, Agent, or Firm* — Maier & Maier, PLLC (57) ABSTRACT

A game device includes: a plurality of displays for displaying an object of an operation target for each of operators; a GUI control unit arranged in any one of the screens of the displays for controlling a GUI for each target object correlated to each of the operators; an object control unit for changing the 3D space according to the operation of the GUI; and a marking process unit for displaying the coordinate position of a predetermined object other than the target object together the target object in the screen as markings to moving on a virtual plane in the 3D space according to control of the object control unit.

6 Claims, 5 Drawing Sheets

GAME DEVICE, OBJECT DISPLAY METHOD IN GAME DEVICE, AND DISPLAY PROGRAM

RELATED APPLICATIONS

The present invention is a National Stage application to PCT/JP2007/065024, filed on Jul. 31, 2007 which claims priority under 35 U.S.C. §119 to Japanese Patent Application No. 2006-208707, filed on Jul. 31, 2006, the disclosures of which are incorporated by reference herein in its entirety.

TECHNICAL FIELD

The present invention relates to a game device, an object display method in the game device, and a display program for proceeding with a game, for example, a sports game such as a golf game, a tennis game or a baseball game, or a 3D scene of a role playing, game, by a plurality of operators who participate the game and performs input operations to objects in a virtual three-dimensional space, and relates to a method and program for displaying the objects on a plurality of display units in the game device.

BACKGROUND ART

Conventionally, television games have been developed in a variety of ways, for example, devices and systems provided as home video game dedicated machines, coin-operated arcade game machines and the like, and in the form of game software which can be run by a general-purpose computer such as a personal computer. On the other hand, with the recent advances in the communications infrastructures, game programs provided through a communication network such as the Internet have become popular as distributed by the so-called online gaming services, which are taking the place of the conventional distribution through recording mediums such as CD-ROM.

There are online games, e.g., sports simulation games such as golf games, role playing games and the like game, which permit a plurality of users to participate in the same game. For example, a golf game proceeds in response to the operation of a ball performed by each of a plurality of users, taking turns, in accordance with the result of each operation.

Incidentally, in a golf game as an online game, since a plurality of player take turns in playing the computer game with game devices which are connected to each other through communication cables, a network or the like, there is a problem that, because while a player is performing operation the other players can do nothing but only wait for own turn, the other players other than the player having a turn become less interested in playing the game.

Patent Document 1 discloses a conventional technique which can solve such a problem. This technique provides a computer game in which characters assigned to players are operated in a plurality of game zones. When characters are located in the same game zone, the players take turns in operating these characters. On the other hand, when characters are located in different game zones, these characters are individually operated.

In accordance with the technique disclosed in Patent Document 1, when a plurality of characters are located in different game zones, a player can operate his character, whether his turn comes or not, without need for waiting other player's operation. It is therefore possible to keep player's interests by minimizing the time the player can do nothing.

However, in the case of the technique disclosed in Patent Document 1 as discussed above, when characters are located in the same game zone, the players have to wait other player's operation. Also, even when characters are located in different game zones, while these characters are individually operated, each character is isolated from the other characters, and thereby there is a problem that the game scene becomes less alive.

In order to solve the problem as described above, it is an object of the present invention to provide a game device, an object display method in the game device, and a display program for proceeding with a game in the game device, wherein it is possible to permit a plurality of users to concurrently perform input operations to objects such as players and balls for use in a golf game or the like game which is played in accordance with operations performed by a plurality of users, and enable the users to perceive a high realistic sensation that the plurality of players have participated the same game.

Patent Document 1: Japanese Patent Published Application No. 2001-198362

DISCLOSURE OF THE INVENTION

In order to accomplish the object as described above, the present invention provides a game device for proceeding with a game by a plurality of operators who participate the game and perform input operations to objects in a virtual three-dimensional space. This game device comprises: a plurality of display units operable to display objects (hereinafter referred to as "the target objects") to be operated by the plurality of operators respectively; a user interface control unit operable to control a graphic user interface which is located in any one of the display units, display the target objects in correspondence with the plurality of operators respectively and enable the plurality of operator to perform operations of the target objects respectively therethrough; an object control unit operable to change the coordinate positions of the objects in the virtual three-dimensional space in response to the operation through the graphic user interface; and a marking process unit operable to display, as well as the target objects, the coordinate positions of predetermined objects other than the target objects in the display units as markings which move a virtual plane in the virtual three-dimensional space.

On the other hand, the present invention provides an object displaying method of displaying objects in a plurality of display units when a game device proceeds with a game by a plurality of operators who participate the game and perform input operations to the objects in a virtual three-dimensional space. The object displaying method comprises:

(1) arranging a graphic user interface in any one of the display units for displaying objects in correspondence with the plurality of operators respectively and enabling the plurality of operator to perform operations of the target objects respectively therethrough;

(2) changing the coordinate positions of the objects in the virtual three-dimensional space by an object control unit in response to the operation through the graphic user interface; and (3) displaying, as well as the target objects, the coordinate positions of predetermined objects other than the target objects in the display units as markings which move a virtual plane in the virtual three-dimensional space, by a marking process unit.

In accordance with the present invention as described above, it is possible to permit a plurality of players to concurrently perform operations in one virtual 3D space, which operations have conventionally been permitted only by taking turns, and display, on the display unit for operation of each player, the positions of the other players by the markings. By this configuration, while each player can perform operation to play the game without need for waiting other player's operation, the positions of the other player can be displayed in a realistic manner to make the scene alive.

Preferably, in accordance with the above invention, at least the display unit, the user interface control unit and the marking process unit are provided for a terminal device which is provided in correspondence with each operator, wherein the respective terminal devices transmit and receive coordinate position information of the target objects of the respective operators through the object control unit, and wherein the marking process unit of each terminal device displays the marking on the basis of the coordinate position information of the target object of another operator which is received at the each terminal device. In this case, the user can concurrently play the game together with another user located at a remote site through the communication line.

Also, in accordance with the above invention, it is preferred that the object control unit is installed in a server which is located in a communication network to which the terminal device is connected, wherein the server simultaneously distributes the coordinate position information of the target objects of the respective operators which is received through the communication network as integrated data among the respective terminal devices. In this case, even when a plurality of users have participated, since the server on the communication network performs data integration, it is possible to reduce the communication traffic amount, and lessen the load on each terminal device.

Incidentally, the system and method of the present invention as described above can be implemented by running a program written in a predetermined language on a computer. In addition, such a program can be stored in a computer readable medium, so that the program can be easily maintained, transported and installed.

BEST MODE FOR CARRYING OUT THE INVENTION (Configuration of 3D Game Device)

Figure 1:
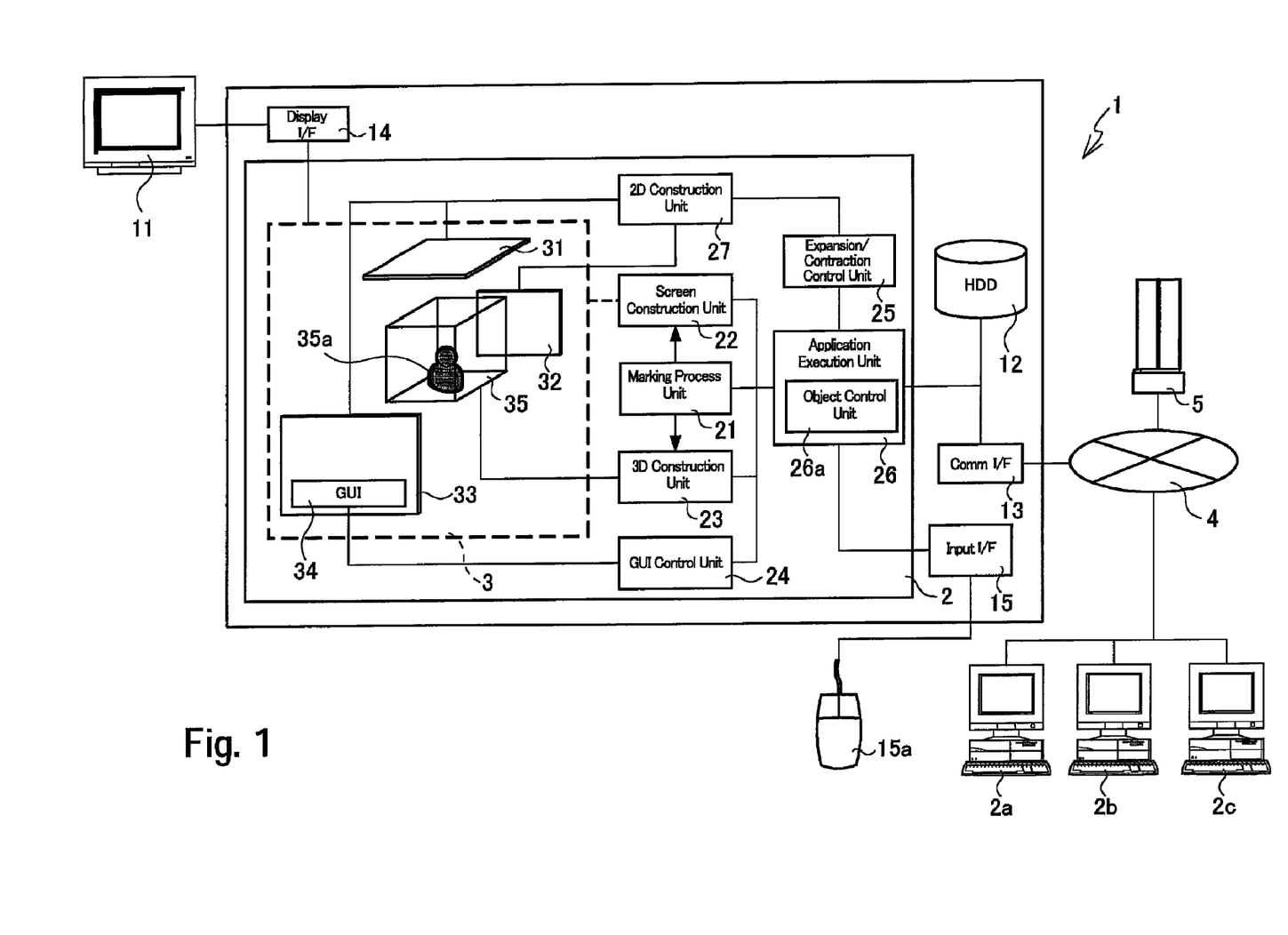
FIG. 1 is a block diagram for showing the configuration of the 3D game device in accordance with an embodiment.

An embodiment of the present invention will be explained with reference to the accompanying drawings. FIG. 1 is a block diagram which shows the configuration of the 3D game device in accordance with the present embodiment. Incidentally, the example of the present embodiment is described in the case where golf game software is run on a personal computer 1. Also, while the present invention is applied to the golf game software in the case of the present embodiment, the present invention is not limited thereto, but also applied to, for example, race games, role-playing games including 3D scenes, and any other game software which permits a plurality of users (operators) to participate the game, perform input operations and proceed with the game by the use of objects such as players and balls.

Figure 2:
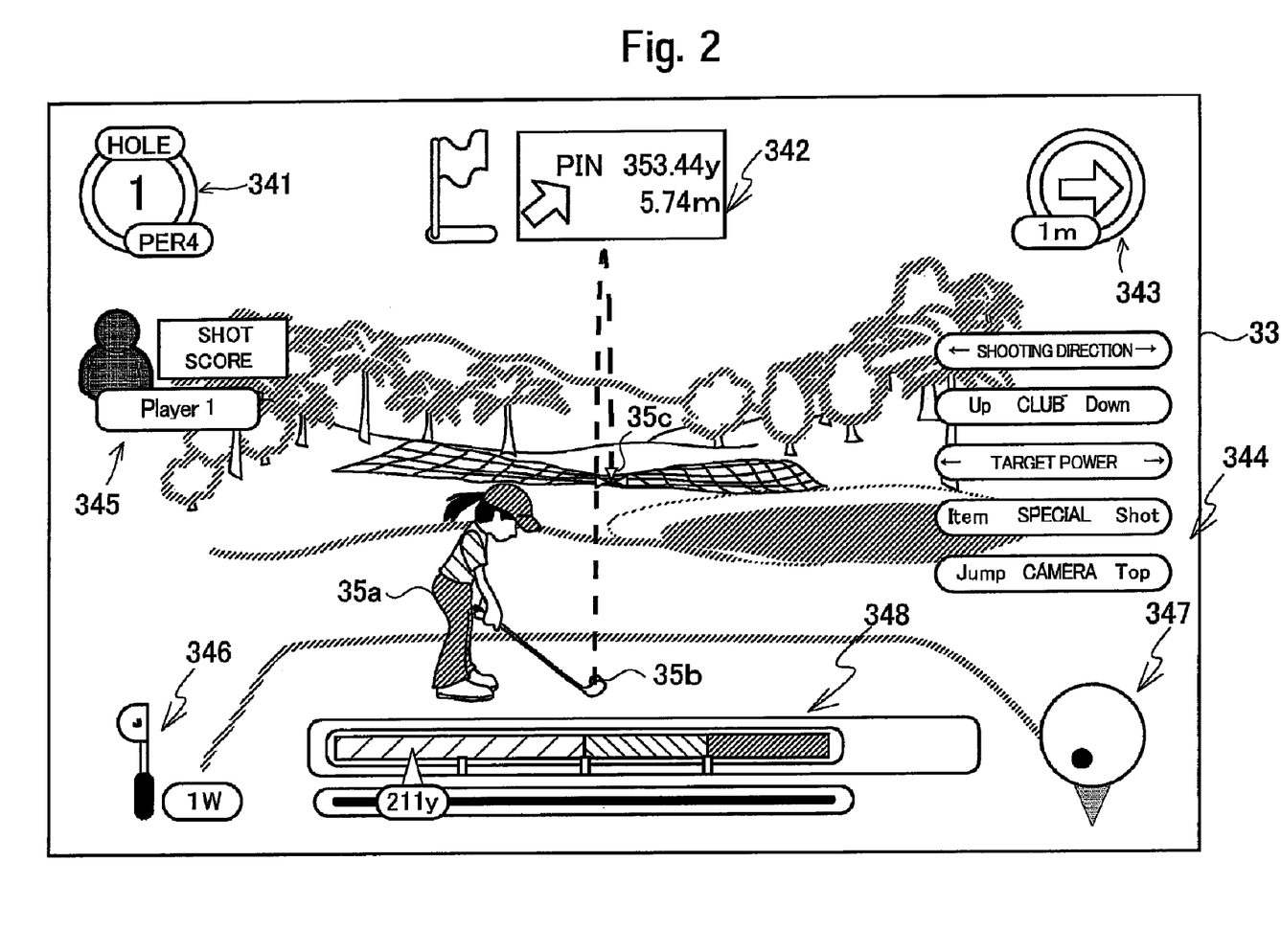
FIG. 2 is an explanatory view for showing the screen layout of the 3D game device in accordance with the embodiment.

The 3D game apparatus in accordance with the present embodiment is implemented with the personal computers 1 and 2a to 2c in which golf game software is run. In the case of the present embodiment, these personal computers 1 and 2a to 2c are provided, one for each user, with a user interface for each user. Also, as illustrated in FIG. 2, a display means (display 11 or the like) is provided for each user to display target objects (a particular player, a ball and other background) respectively to be manipulated by the each user. Incidentally, while this game may be played with a plurality of the personal computers which are used as game devices and operated by a plurality of users respectively as in the case of the present embodiment, it is also possible to use a single game device such as a game dedicated machine shared by a plurality of users, and a plurality of game controllers which are provided for the plurality of users and connected to interfaces of the game dedicated machine respectively. In this case, the screen of a single display is divided into a plurality of windows in correspondence with the plurality of users, and each window is used to display the GUI and target objects for the user assigned to this each window, and enable the user to operate the GUI and target objects with the game controller.

Each of these personal computers 1 and 2a to 2c is an arithmetic processing unit, which is used by each user and provided with a CPU and a storage device, and can be implemented by a general purpose computer such as a personal computer, and a dedicated device such as a game dedicated machine specialized for certain features. Furthermore, a mobile computer, PDA (Personal Digital Assistance), a cellular phone or the like can be used as this personal computer.

More specifically speaking, as illustrated in FIG. 1, each of these personal computers 1 and 2a to 2c is provided with a CPU 2 for performing arithmetic operation, a storage device 12 such as a hard disk for storing data and programs, a communication interface (I/F) 13 for connecting the computer with a communication network 4 such as the Internet, a display interface (I/F) 14 for connecting a display device such as the display 11 to the computer, and an input interface (I/F) 15 for connecting an input device 15a such as a mouse, a keyboard, a controller or the like to the computer.

Meanwhile, in the case of the present embodiment, the personal computer 1 is capable of accessing a game server 5 through the communication network 4, and performing communication with the computers (game devices) 2a to 2c which are used by other users through this game server 5, such that a number of users can participate the same game program through the game server 5.

In other words, when playing the online game through this communication network 4, the respective entry players share the information of the entry players (the properties of characters to be used, the properties of items such as own clubs, or other information necessary for playing the game) and the information necessary for demonstration as delivered to the terminals of the respective entry players through the game server 5. On the other hand, the information on the 3D shapes of courses, the design of each character, texture and so forth relating to the presentation of a virtual space is installed in the terminal of each user in advance. The graphic processes of three-dimensional and two-dimensional images are performed on the user terminal side, such that the condition of each player and the development of the game are synchronized and reflected to the user terminal on a real time base. Incidentally, during playing the game, while providing enhanced demonstration, making the scene alive and enabling the entry players to deliver and share information as talking theiramong at certain intervals, the information is shared in a simple manner during inputting a shot condition, and the input condition after finishing the input operation is completely shared through the server 5.

A variety of modules are built up by driving the CPU 2 to run a golf game software. In the context of this document, the term "module" is intended to encompass any function unit capable of performing necessary operation, as implemented with hardware such as a device or an apparatus, software capable of performing the functionality of the hardware, or any combination thereof.

More specifically described, the CPU 2 runs the golf game software to build up the marking process unit 21, a screen construction unit 22, a 3D construction unit 23, a GUI control unit 24, an expansion/contraction control unit 25, an application running unit 26 and a 2D construction unit 27.

The application running unit 26 is a module for running the golf game software to proceed with the golf game by objects which are arranged in a 3D virtual space 3. More specifically speaking, the application running unit 26 performs progress management of the game in accordance with the rules of golf (OB is counted as one penalty stroke; when there are a plurality of players, each player makes a shot in a controlled order; and so forth), score management on the basis of development of the golf game, and arithmetic operations necessary for ballistic simulation of the projectile in the virtual space by calculating the stroke condition of a ball in accordance with stroke analysis on the basis of the ability parameters of the character and the properties of items as used, such as a golf club.

Incidentally, while a virtual 3D space 3 is constructed to make alive the scene and the like in the case of this golf game program, since the display device the user views is two-dimensional, the interface is provided for helping the user to spatially recognize the space by automatically performing the camera work which is moved in the vertical plane along the shooting direction, representing this plane in association with a power gage, and so forth.

This application running unit 26 is provided further with an object control unit 26*a*, which is a module for calculating the flying distance of a ball on the basis of the stroke data which is input by the operator, and obtaining the coordinates of the ball after flying. The 3D construction unit 23 constructs a 3D animation on the basis of the coordinates of the ball after flying, and the 2D construction unit 27 generates a two-dimensional image to be two-dimensionally displayed in each window on the basis of the 3D animation, followed by displaying the two-dimensional image on the display 11 through the display interface 14.

Then, the golf game program receives the user operation through the input device 15*a*, proceeds with the game in accordance with the condition (manipulation data) acquired by the user operation, generates display information items (3D polygons and so forth), displays the display information items in the windows 31 to 33 as two-dimensional planes, and outputs sound associated with the display.

The screen construction unit 22 is a module for controlling the windows 31 to 33 displayed in the screen. Specifically speaking, while a virtual camera is provided for setting the field-of-view range in the virtual 3D space 3, the objects imaged by the virtual camera are displayed in the respective windows 31 to 33 as two-dimensional planes. Meanwhile, in the case of the present embodiment, the window 33 is a main window showing a shot over the player in a full view of a golf course. The main window includes the GUI 34. Also, the window 32 is a jump window in which is imaged the location near the position a ball reaches, and the window 31 is a top window in which is imaged the golf course as a bird's-eye view.

The 3D construction unit 23 is a module for virtually constructing the virtual 3D space 3, and forming stereoscopic images of the objects, which are located in the position coordinates 35 of this virtual 3D space 3, by polygon rendering. The 2D construction unit 27 is a module for two-dimensionally displaying the stereoscopic images formed by the 3D construction unit 23 in the windows 31 to 33 in accordance with the field-of-view range and camera angle of each of the windows 31 to 33 on the basis of the type, area and shape of each window. The expansion/contraction control unit 25 is a module for changing the area and profile of the windows 31 to 33 on the basis of the operation through the input device 27*a*.

Figure 3:
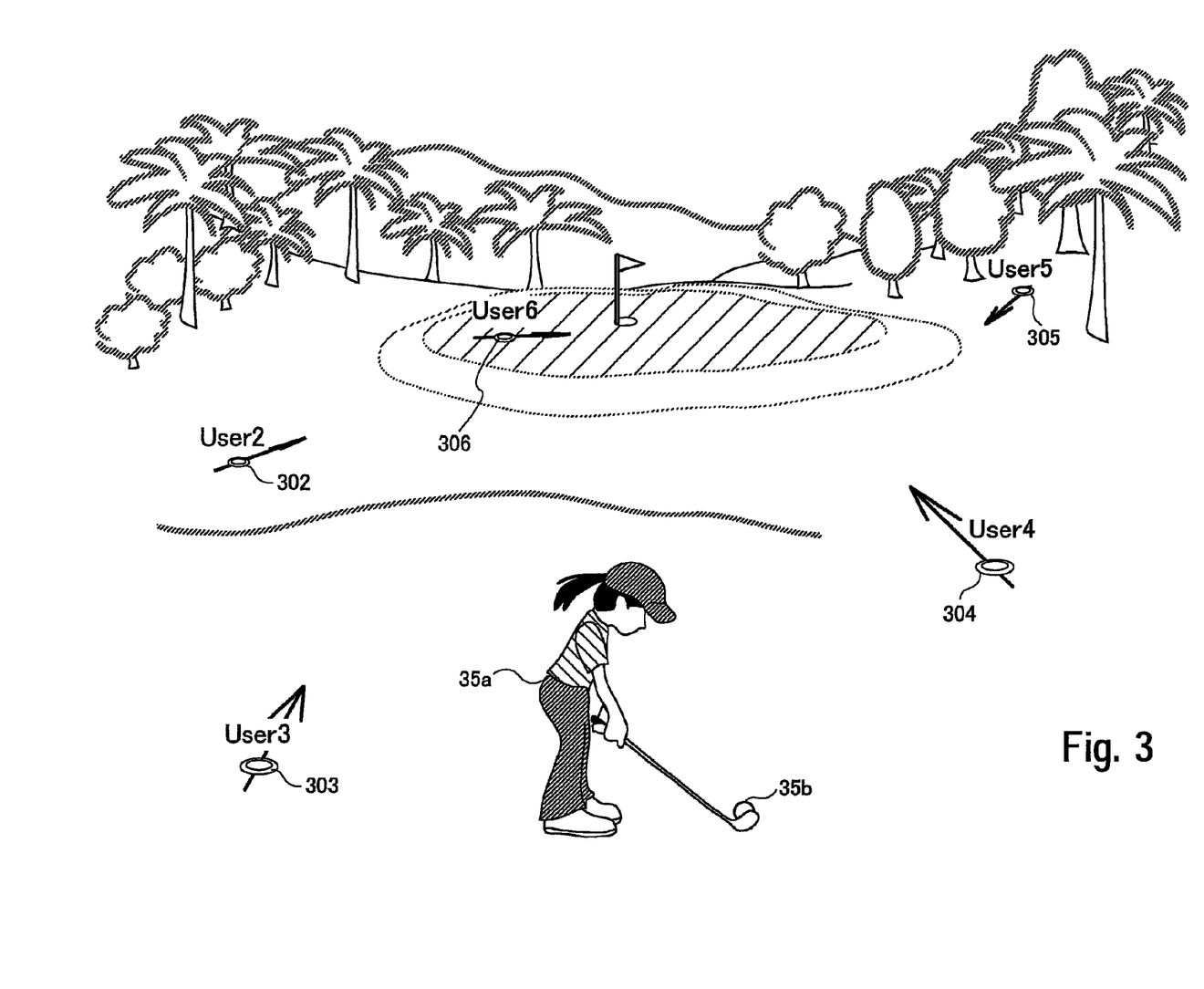
FIG. 3 is an explanatory view for showing markings displayed in the screen of the 3D game device in accordance with the embodiment.

The marking process unit 21 is a module for displaying, in the screen in which are displayed the target objects (i.e., the player 35*a* and the golf ball 35*b* which are the objects to be controlled through the GUI 34 of the personal computer 1), the markings 302 to 306 which represent the positions of predetermined objects other than these target objects and move on a virtual plane (the surface of the ground 36) in the virtual 3D space 35 under the control of the object control unit 26*a* as illustrated in FIG. 3.

When performing the process of displaying these markings 302 to 306, these personal computers 1 and 2*a* to 2*c* transmit and receive the coordinate position information of the target objects of the respective operators through the communication interface 13 via the game server 5, and the marking process unit 21 of each terminal displays the markings on the basis of the coordinate position information of the other operators received by this each terminal. Incidentally, the game server 5 simultaneously distributes, among the respective terminals, the coordinate position information of the target objects of the respective operators as received from the respective terminals as integrated data.

Figure 4:
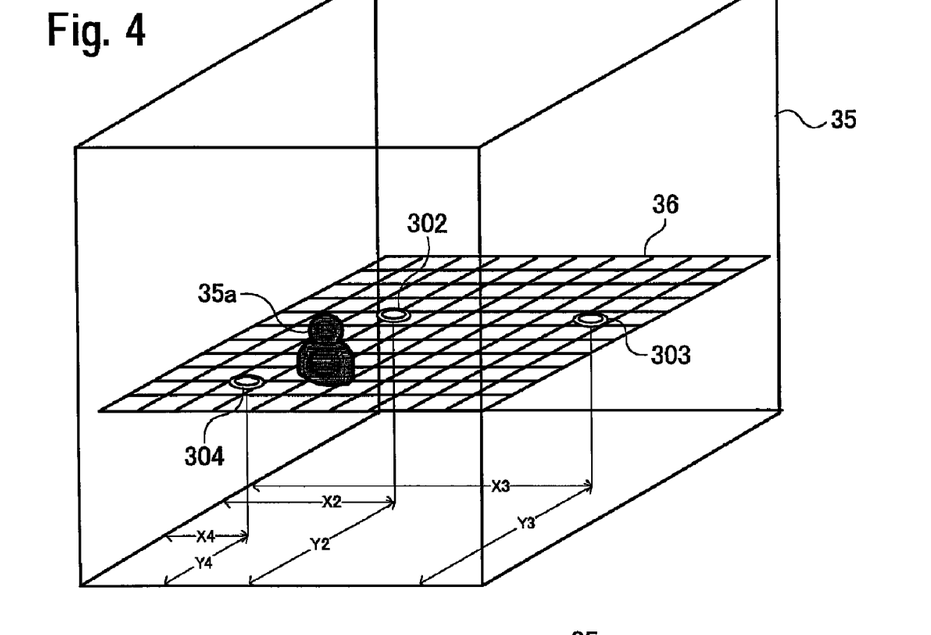
FIG. 4 is an explanatory view for showing the arithmetic operation of displaying markings in the screen of the 3D game device in accordance with the embodiment.
Figure 5:
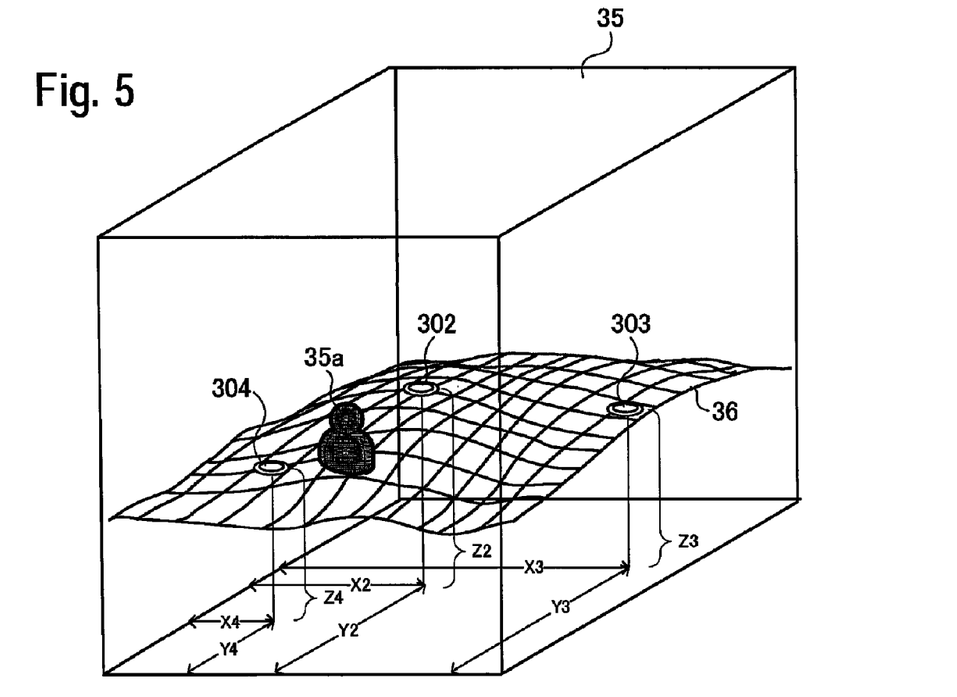
FIG. 5 is an explanatory view for showing the arithmetic operation of displaying markings in the screen of the 3D game device in accordance with the embodiment.

In the case of the present embodiment, as illustrated in FIG. 4, the coordinate position information of the target objects of the respective operators as relayed by the game server 5 are given as two-dimensional coordinates (x, y) on the surface of the ground 36 (horizontal plane) as defined in the virtual 3D space 3. The object control unit 26*a* acquires the two-dimensional coordinate information, calculates the coordinates (x, y, z) of the markings in the 3D space, and outputs the calculation results to the marking process unit 21. Since the surface of the ground 36 is a flat surface without undulation in the case of the present embodiment, the surface of the ground 36 is represented by the coordinates position with a constant height coordinate z. Meanwhile, in the case where the surface of the ground 36 is defined as an undulating plane as illustrated in FIG. 5, the marking process unit 21 calculates the heights of the surface of the ground 36 as the coordinates (x, y, z) of the markings in the virtual 3D space 35 on the basis of the equation defining the unevenness of the surface of the ground 36 with reference to the two-dimensional coordinate positions (x, y) of the other players which are acquired through the game server 5.

After calculating the coordinate positions of the target objects and other objects as well as the coordinate positions of the markings in the virtual 3D space 35, the marking process unit 21 outputs the results of calculation to the screen construction unit 22 and the 3D construction unit 23. The 3D construction unit 23 performs polygon processes of the respective objects (inclusive of the markings). The 2D construction unit 27 then two-dimensionally reconstructs these objects and displays the two-dimensional images of these objects in the respective windows 31 to 33.

The GUI control unit 24 is a module for controlling the graphic user interface (GUI) 34. In the case of the present embodiment, the operation of an object displayed on the display 11 is input by the use of the input device 27a through the GUI 34 such that the golf game proceeds in accordance with the operation.

The GUI 34 is located in the screen of the display 11 and provides graphic controls for displaying and operating the target objects in correspondence with a plurality of operators respectively. In the case of the present embodiment, the GUI 34 is displayed mainly in the main window 33. More specifically described, this GUI 34 comprises an icon 341 indicative of the progress of the golf game (hole number and par type), an icon 342 indicative of the distance and direction to the pin, an icon 343 indicative of how the wind blows, icons 344 indicative of the status of the player (shooting direction, club, target power, camera position, and the like), icons 345 indicative of the name and score of the player, an icon 346 indicative of the golf club the player has selected, an icon 347 indicative of the stroke point of the ball, an icon 348 and target icon 35c which are operated when striking the ball, and so, forth, as illustrated in FIG. 2.

(Input Program)

The system and method of the present embodiment as described above can be implemented by running an input program written in a predetermined language on a computer. Namely, the system having the functionality as described above can easily be implemented by installing this program in a computer such as a user terminal, or an IC chip and so forth, and running the program on the CPU. This program can be distributed, for example, through a communication line, or as a package application which can be run on a stand-alone computer.

Figure 6:
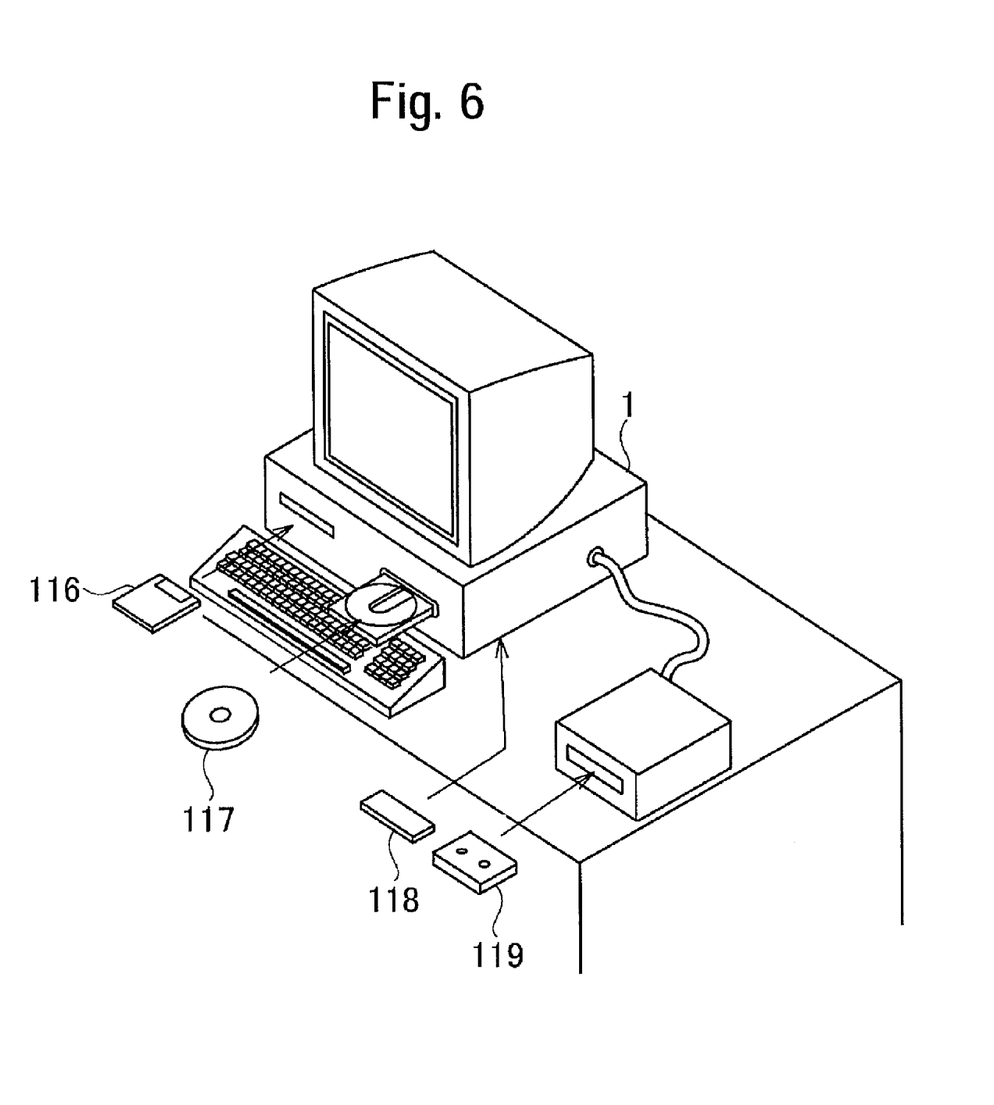
FIG. 6 is a perspective view for showing computer readable recording mediums in accordance with the embodiment.

This program may be stored in a recording medium 116 to 119 which can be read by the personal computer 1 as shown in FIG. 6. More specifically speaking, as shown in the same figure, the program may be stored in a magnetic recording medium such as a flexible disk 116 or a cassette tape 119, or an optical disc such as CD-ROM or DVD-ROM 117, a RAM card 118 and so forth. The present embodiment is characterized in that a link can be included in content recorded on a CD-ROM or DVD-ROM 117 which cannot be altered.

Then, in accordance with the computer readable medium in which the program is stored, the system and method as described above can be implemented with a general purpose computer or a dedicated computer, so that the program can be easily maintained, transported and installed.

(Actions/Effects)

As has been explained above, in accordance with the present embodiment, it is possible to permit a plurality of players to concurrently perform operations of the golf game in one virtual 3D space, which operations have conventionally been permitted only by taking turns, and display, on the display 11 for operation of each player, the positions of the other players by the markings 302 to 306. By this configuration, while each player can perform operation to play the golf game without need for waiting other player's operation, the positions of the other player can be displayed in the screen image for each user in a realistic manner to make the scene alive.

INDUSTRIAL APPLICABILITY

As has been discussed above, in accordance with the present invention, it is possible to permit a plurality of users to concurrently perform input operations to objects such as players and balls for use in a golf game or the like which is played by operations performed by a plurality of users, and enable the users to perceive a high realistic sensation that the plurality of players have participated the same game.

What is claimed is:

1. A game device for proceeding with a game by a plurality of operators who participate the game and perform input operations to objects in a virtual three-dimensional space, said game device comprising:

a plurality of display units operable to display objects (hereinafter referred to as "a target objects") to be operated by the plurality of operators respectively;

a user interface control unit operable to control a graphic user interface which is located in any one of the display units, display the target objects in correspondence with the plurality of operators respectively and enable the plurality of operator to perform operations of the target objects respectively therethrough;

an object control unit operable to change the coordinate positions of the objects in the virtual three-dimensional space in response to the operation through the graphic user interface; and a marking process unit operable to display, as well as the target objects, the coordinate positions of predetermined objects other than the target objects in the display units as markings which move a virtual plane in the virtual three-dimensional space wherein at least the display unit, the user interface control unit and the marking process unit are provided for a terminal device which is provided in correspondence with each operator, wherein the respective terminal devices transmit and receive coordinate position information of the target objects of the respective operators through the object control unit, and wherein the marking process unit of each terminal device displays the marking on the basis of the coordinate position information of the target object of another operator which is received by the each terminal device.

2. The game device as claimed in claim 1 wherein the object control unit is installed in a server which is located in a communication network to which the terminal device is connected, wherein the server simultaneously distributes the coordinate position information of the target objects of the respective operators which is received through the communication network as integrated data among the respective terminal devices.

3. An object displaying method of displaying objects in a plurality of display units when a game device proceeds with a game by a plurality of operators who participate the game and perform input operations to the objects in a virtual three-dimensional space, said method comprising:

a step (1) of arranging a graphic user interface in any one of the display units for displaying objects (hereinafter referred to as "a target objects") in correspondence with the plurality of operators respectively and enabling the plurality of operator to perform operations of the target objects respectively therethrough;

a step (2) of changing the coordinate positions of the objects in the virtual three-dimensional space by an object control unit in response to the operation through the graphic user interface; and a step (3) of displaying, as well as the target objects, the coordinate positions of predetermined objects other than the target objects in the display units as markings which move a virtual plane in the virtual three-dimensional space, by a marking process unit wherein at least the display unit, a user interface control unit and the marking process unit are provided for a terminal device which is provided in correspondence with each operator, wherein, in the step (3), the respective terminal devices transmit and receive coordinate position information of the target objects of the respective operators through the object control unit, and wherein the marking process unit of each terminal device displays the marking on the basis of the coordinate position information of the target object of another operator which is received at the each terminal device.

4. The object displaying method as claimed in claim 3 wherein the object control unit is installed in a server which is located in a communication network to which the terminal device is connected, wherein the server simultaneously distributes the coordinate position information of the target objects of the respective operators which is received through the communication network as integrated data among the respective terminal devices.

5. An object displaying program for displaying objects in a plurality of display units, when a game device proceeds with a game by a plurality of operators who participate the game and perform input operations to the objects in a virtual three-dimensional space, by a computer serving as the game device, said object displaying program causing a computer to perform a step (1) of arranging a graphic user interface in any one of the display units for displaying objects (hereinafter referred to as "a target objects") in correspondence with the plurality of operators respectively and enabling the plurality of operator to perform operations of the target objects respectively therethrough;

a step (2) of changing the coordinate positions of the objects in the virtual three-dimensional space by an object control unit in response to the operation through the graphic user interface; and a step (3) of displaying, as well as the target objects, the coordinate positions of predetermined objects other than the target objects in the display units as markings which move a virtual plane in the virtual three-dimensional space, by a marking process unit wherein at least the display unit, a user interface control unit and the marking process unit are provided for a terminal device which is provided in correspondence with each operator, wherein, in the step (3), the respective terminal devices transmit and receive coordinate position information of the target objects of the respective operators through the object control unit, and wherein the marking process unit of each terminal device displays the marking on the basis of the coordinate position information of the target object of another operator which is received at the each terminal device.

6. The object displaying program as claimed in claim 5 wherein the object control unit is installed in a server which is located in a communication network to which the terminal device is connected, wherein the server simultaneously distributes the coordinate position information of the target objects of the respective operators which is received through the communication network as integrated data among the respective terminal devices.

* * * * *